United States Patent Office 2,929,829
Patented Mar. 22, 1960

2,929,829

ORGANOSILICON ACYLAMINO COMPOUNDS AND PROCESS FOR PRODUCING THE SAME

Edward L. Morehouse, Snyder, N.Y., assignor to Union Carbide Corporation, a corporation of New York No Drawing. Application October 12, 1956
Serial No. 615,449

14 Claims. (Cl. 260—448.2)

The present invention relates to organosilicon compounds and to processes for their production. More particularly, this invention is concerned with organosilicon compounds containing among other possible functional groups an acylamino group (i.e.

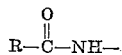

wherein R is an alkyl, aryl or alkenyl group or monovalent heterocyclic ring) which is linked to a silicon atom through a polymethylene chain containing at least three carbon atoms, as new compositions of matter. The invention is also concerned with processes for producing said organosilicon compounds and with uses thereof.

The present invention is based, in part, upon my discovery that silicon compounds containing an acrylamino group, the nitrogen atom of which is attached to a silicon atom through a polymethylene linkage that contains at least three carbon atoms can be produced by the reaction of an organosilicon compound containing the aminoalkylsilyl grouping (i.e. a $NH_2(CH_2)_a Si\equiv$ grouping wherein ($a$) is an integer that has a value of at least 3 and is preferably 3 or 4) with a monocarboxylic organic acid, an ester of a monocarboxylic organic acid, a monocarboxylic organic acid halide or the anhydride of a monocarboxylic organic acid as represented by the following equation:

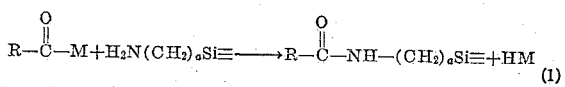
(1)

wherein R is an alkyl group, an aryl group, an alkenyl group or a monovalent heterocyclic ring, M is a halogen atom or an

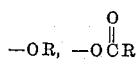

or hydroxyl group and ($a$) has the above-defined meaning.

According to my studies the reaction represented by Equation 1 is a general one and is applicable to all organosilicon compounds which contain the aminoalkylsilyl grouping depicted above. Suitable for use in my process are the aminoalkylalkoxysilanes and the aminoalkylpolysiloxanes, including copolymeric materials which contain both aminoalkylsiloxane and hydrocarbylsiloxane units.

Typical of the aminoalkylalkoxysilanes suitable for use as my organosilicon starting materials are those compounds represented by the structural formula:

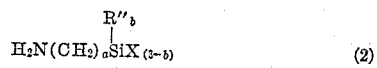
(2)

wherein R″ represents an alkyl group such as the methyl, ethyl, propyl and butyl groups and the like, an aryl group such as the phenyl, naphthyl and tolyl groups and the like or an aralkyl group such as the benzyl group and the like, X represents an alkoxy group such as the methoxy, ethoxy and propoxy groups and 2-ethylhexoxy and the like, ($a$) is an integer having a value of at least 3 and preferably a value of from 3 to 4 and ($b$) is an integer having a value of from 0 to 2 and preferably a value of from 0 to 1. Illustrative of such aminoalkylalkoxysilanes are gamma - aminopropyltriethoxysilane, gamma-aminopropylmethyldiethoxysilane, gamma-aminopropylethyldiethoxysilane, gamma-aminopropylphenyldiethoxysilane, delta - aminobutyltriethoxysilane, delta-aminobutylmethyldiethoxysilane, delta-aminobutylethyldiethoxysilane, delta-aminobutylphenyldiethoxysilane and the like.

Typical of the aminoalkylpolysiloxanes suitable for use as my organosilicon starting materials are those polysiloxanes which contain the structural unit:

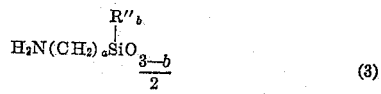
(3)

wherein R″, ($a$) and ($b$) have the same values described above. Such polysiloxanes are prepared by the hydrolysis and condensation of those aminoalkylalkoxysilanes described above or by the cohydrolysis and cocondensation of such aminoalkylalkoxysilanes with other hydrolyzable silanes and can include aminoalkylpolysiloxanes of the trifunctional variety (i.e. where $b=0$) aminoalkylalkylpolysiloxanes and aminoalkylarylpolysiloxanes of the difunctional variety which include cyclic or linear polysiloxanes (i.e. where $b=1$) and linear aminoalkyldialkyldisiloxanes of the monofunctional variety (i.e. where $b=2$) as well as the mixtures of compounds produced by the cohydrolysis of difunctional and trifunctional aminoalkylalkoxysilanes.

Suitable starting aminoalkylpolysiloxanes of the trifunctional variety can be more specifically depicted as containing the structural unit:

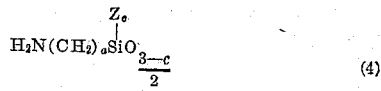
(4)

wherein ($a$) has the value previously described, Z represents an hydroxyl or alkoxy group and ($c$) has an average value of from 0 to 1 or as high as 2 but preferably from 0.1 to 1.0. Aminoalkylpolysiloxanes of this variety which are essentially free of silicon-bonded alkoxy or hydroxyl groups (i.e. where $c=0$) can be prepared by the complete hydrolysis and complete condensation of aminoalkyltrialkoxysilanes, whereas aminoalkylpolysiloxanes which contain silicon-bonded alkoxy groups can be prepared by the partial hydrolysis and complete condensation of the same starting silanes. On the other hand, aminoalkylpolysiloxanes which contain silicon-bonded hydroxyl groups can be prepared by the complete hydrolysis and partial condensation of the same aminoalkyltrialkoxysilanes. By way of illustration, a gamma-aminopropylpolysiloxane containing silicon-bonded ethoxy groups can be prepared by hydrolyzing gamma-aminopropyltriethoxysilane with an amount of water insufficient to react with all of the silicon-bonded ethoxy groups present on the starting silane and subsequently condensing the hydrolyzate so formed to produce the desired polymer.

Suitable starting aminoalkylpolysiloxanes of the difunctional variety which include cyclic and linear polysiloxanes can be more specifically defined by the structural formula:

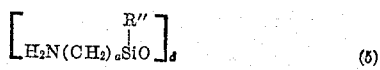
(5)

wherein R″ and ($a$) have the values previously described and ($d$) is an integer having a value of at least 3 and can be as high as 7 for the cyclic aminoalkylpolysiloxanes and higher for the linear aminoalkylpolysiloxanes. Such cyclic and linear aminoalkylpolysiloxanes can be prepared by the hydrolysis and condensation of aminoalkylalkyldiethoxysilanes or aminoalkylaryldiethoxysilanes. In carrying out the hydrolysis and condensation procedures there is produced a product comprising a mixture of cyclic and linear polysiloxanes from which the desired polysiloxane can be recovered. Illustrative of the cyclic aminoalkylsiloxanes suitable for use as the organosilicon starting material in my process are the cyclic tetramer of gamma-aminopropylmethylsiloxane, the cyclic tetramer of delta-aminobutylphenylsiloxane and the like. Illustrative of linear aminoalkylpolysiloxanes suitable for use as the organosilicon starting material in my process are gamma-aminopropylmethylpolysiloxane, gamma-aminopropylethylpolysiloxane, delta-aminobutylmethylpolysiloxane and the like.

Included among the linear aminoalkylpolysiloxanes suitable for use as the organosilicon starting material in my process are the alkyl, alkoxy and hydroxyl end-blocked polysiloxanes which contain from 1 to 3 of such groups bonded to the terminal silicon atoms of the molecules comprising the polymeric chains. Thus I can also employ as my starting materials such linear end-blocked aminoalkylpolysiloxanes as monoethoxy end-blocked gamma-aminopropylethylpolysiloxane or methyldiethoxysilyl end-blocked delta-aminobutylmethylpolysiloxane or monoethoxydimethylsilyl end-blocked gamma-aminopropylphenylpolysiloxane and the like. The end-blocked linear aminoalkylalkylpolysiloxanes and aminoalkylarylpolysiloxanes useful in our process can be prepared by the equilibration of cyclic aminoalkylsiloxanes with silicon compounds containing predominantly silicon-bonded alkoxy groups, or by the cohydrolysis and condensation of trialkylalkoxysilanes with aminoalkylalkyldiethoxysilanes or aminoalkylaryldiethoxysilanes. Hydroxyl end-blocked linear polysiloxanes can also be prepared by heating linear or cyclic aminoalkylpolysiloxanes with water.

The copolymeric aminoalkylpolysiloxanes which can be employed as starting materials can be depicted as containing both the structural units:

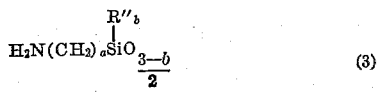 (3)

and

 (6)

wherein R'', (a) and (b) have the values described above and (e) is an integer having a value of from 0 to 2. The copolymers suitable for use as the organosilicon starting material in my process can contain various combined siloxane units such as trifunctional aminoalkylsiloxane units (where $b=0$) with trifunctional alkyl-, aryl- or mixed alkyl- and arylsiloxane units (where $e=0$) or with difunctional alkyl, aryl- or mixed alkyl- and arylsiloxane units (where $e=1$). These copolymers can also contain various combined siloxane units; difunctional aminoalkylsiloxane units (where $b=1$) with trifunctional alkyl-, aryl- or mixed alkyl- and arylsiloxane units (where $e=0$) or with difunctional alkyl-, aryl- or mixed alkyl- and arylsiloxane units (where $e=1$).

Those copolymers which contain trifunctional aminoalkylsiloxane units and other siloxane units are preferably prepared by the cohydrolysis and cocondensation of the corresponding alkoxysilane starting materials. Such copolymers can contain silicon-bonded alkoxy or hydroxyl groups or they can comprise essentially completely condensed materials. The linear and cyclic copolymeric siloxanes are preferably prepared by the separate hydrolysis and condensation of an aminoalkylalkyldialkoxysilane or aminoalkylaryldialkoxysilane and the dialkyldialkoxysilane or diaryldialkoxysilane to cyclic aminoalkylsiloxanes and cyclic dialkylsiloxanes or diarylsiloxanes and subsequently equilibrating mixtures of such cyclic siloxanes to linear copolymers. Such linear copolymers can also contain chain-terminating or end-blocking groups such as alkyl, alkoxy or hydroxyl groups.

The aminoalkylalkoxysilanes and aminoalkylpolysiloxanes as well as copolymers containing aminoalkylsiloxane and hydrocarbylsiloxane units are all disclosed and claimed as new compositions of matter in copending U.S. application Serial Nos. 615,466; 615,481; 615,483 and 615,507 filed concurrently herewith Serial Nos. 615,481 and 615,483 now being abandoned. Processes for producing such compounds are also disclosed and claimed in said copending applications.

I have found that the reaction represented by Equation 1 is generally applicable to all monocarboxylic organic acids and the acid halide, ester and anhydride derivatives thereof. These latter-mentioned compounds are organic carbonyl compounds that may be represented by the structural formula:

 (7a)

wherein R is an alkyl, aryl, alkenyl or monovalent heterocyclic group and M is a

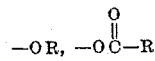

or a hydroxyl group or a halogen atom. These organic carbonyl compounds that are useful as starting materials in producing the compositions of this invention are depicted more specifically in structural Formulae 7b through 10 below.

Typical of the monocarboxylic organic acids that are useful as starting materials in producing the compositions of this invention are those compounds represented by the structural formula:

 (7b)

wherein R is an alkyl group, an alkenyl group, an aryl group, or a monovalent heterocyclic ring. The latter-mentioned heterocyclic rings represented by R may contain carbon and at least one other element such as nitrogen, oxygen or sulfur. The groups and rings represented by R in these starting materials may contain such substituents as one or more nitro groups, halogen atoms, alkoxy groups, cyano groups, amino groups, hydrocarbylthio (e.g. methylthio) groups, the above-mentioned monovalent heterocyclic rings and the like. The groups and rings represented by R are free of substituents that contain a carbonyl group. Illustrative of these acids are acetic acid, oleic acid, stearic acid, benzoic acid, para-aminobenzoic acid, para-nitrobenzoic acid, acrylic acid, nicotinic acid, 2-carboxypyrrole, 2-carboxyfuran, 2-carthiophene, 2-carboxythiazole, 3-carboxypyrazole, 2-carboxyglyoxaline and the like. I prefer to use as starting materials monocarboxylic organic acids that may be represented by structural Formula 7 wherein R is an alkyl or an alkenyl group that contains from 1 to 12 or as high as 20 carbon atoms or a phenyl group.

Monocarboxylic organic acids which form very stable salts with compounds containing the aminoalkylsilyl grouping, such as trichloroacetic acid, are not particularly useful as reactants in producing the compositions of this invention. However, derivatives of the latter-mentioned acids, such as ethyltrichloroacetate are generally useful as reactants in producing the compositions of this invention.

Typical of the esters of monocarboxylic organic acids that are useful as starting materials in producing the compositions of this invention are those compounds represented by the structural formula:

 (8)

wherein R has the above-defined meaning. These esters may be considered as derivatives of the acids represented by structural Formula 7. Illustrative of these esters are ethyldichloroacetate, ethyl benzoate, methyl oleate, vinyl acetate, phenyl benzoate, ethyl para-nitrobenzoate, ethyl acetate, and 2-carbethoxypyrrole, 2-carbethoxyfuran, 2-carbethoxythiophene, 2-carbethoxythiazole, 3-carbethoxypyrazole, 2-carbethoxyglyoxaline and the like. I prefer to use as starting materials esters of monocarboxylic organic acids that may be represented by structural Formula 8 wherein R is an alkyl or an alkenyl group that contains from 1 to 12 or as high as 20 carbon atoms or a phenyl group.

Typical of the monocarboxylic organic acid halides that are useful as starting materials in producing the compositions of this invention are those compounds represented by the structural formula:

wherein R has the above-defined meaning and G is a halogen atom. These acid halides may be considered as derivatives of the acids represented by structural Formula 7. Illustrative of these acid halides are para-nitrobenzoyl chloride, benzoyl chloride, acetyl chloride, propanoyl bromide, acryloyl bromide and the acid chlorides of 2-carboxypyrrole, 2-carboxyfuran, 2-carboxythiophene, nicotinic acid, 2-carboxythiazole, 2-carboxypyrazole, 2-carboxyglyoxaline and the like. I prefer to use as starting materials acid halides that are represented by structural Formula 9 wherein R is an alkyl or alkenyl group that contains from 1 to 12 or as high as 20 carbons or a phenyl group and G is a bromine atom or, more preferably, a chlorine atom.

Typical of the anhydrides of monocarboxylic organic acids that are useful as starting materials in producing the compositions of this invention are those compounds that are represented by the structural formula:

$$(RCO)_2O \qquad (10)$$

wherein R has the above-defined meaning. These anhydrides may be considered as derivatives of the acids represented by structural Formula 7. Illustrative of these anhydrides are acetic anhydride, benzoic anhydride, acrylic anhydride, the anyhdrides of 2-carboxypyrrole, 2-carboxyfuran, 2-carboxythiophene, nicotinic acid, 2-carboxythiazole, 3-carboxypyrazole and 2-carboxyglyoxaline and the like. I prefer to use as starting materials anhydrides that are represented by the structural Formula 1 wherein R is an alkyl or an alkenyl group that contains from 1 to 12 or as high as 20 carbon atoms or a phenyl group.

It is often preferable to use derivatives of organic acids, rather than the organic acids themselves, as starting materials in producing the compositions of this invention. One reason for this preference is the formation of salts as intermediates when organic acids are used. These salts are converted to the compositions of this invention but, since these salts are often solids, processing difficulties, such as the need for agitation to suspend the solid salts, are encountered. Conversely, when the organic starting material is unsaturated, I prefer to use alpha-beta olefinically unsaturated monocarboxylic organic acids as starting materials rather than the ester, acid halide and anhydride derivatives thereof. It was found that rather than undergoing the desired reaction to form an amide, the aminoalkylsilicon compounds used as reactants often added to the double bond of derivatives of alpha-beta olefinically unsaturated monocarboxylic organic acids according to a reaction that may be illustrated by the equation:

wherein (a) has the above-defined meaning. Processes that involve reactions that may be illustrated by the latter equation as well as compounds produced by these processes are described and claimed in the copending U.S. patent application Serial No. 615,480, filed concurrently herewith. Alpha-beta olefinically unsaturated monocarboxylic organic acids react with organosilicon compounds containing the aminoalkylsilyl grouping to form compounds of this invention.

The process of our invention can be carried out by forming a mixture of an organosilicon compound containing the aminoalkylsilyl grouping depicted above with a monocarboxylic organic acid, an ester of a monocarboxylic organic acid, a monocarboxylic organic acid halide or the anhydride of a monocarboxylic organic acid and maintaining the mixture at a temperature at which the organosilicon compound and the monocarboxylic organic acid, an ester of a monocarboxylic organic acid, a monocarboxylic organic acid halide or the anhydride of a monocarboxylic organic acid react to produce an organosilicon compound containing an acylamino group the nitrogen atom of which is attached to a silicon atom by a polymethylene chain containing at least three carbon atoms.

The relative amounts of the organosilicon compounds containing the amino alkylsilyl grouping and the acids or derivatives thereof (i.e. a monocarboxylic organic acid, an ester of a monocarboxylic organic acid, a monocarboxylic organic acid halide or the anhydride of a monocarboxylic organic acid) used as starting materials in my process are not narrowly critical. I can employ for each gram atom of nitrogen present in my starting organosilicon compound from 1 to 10 chemical equivalents (based on the carbonyl groups present in the —COOH group of the acid, or in the —COG group of the acid halide, or in the COOR group of the ester, or in the —COOOC— group of the anhydride) of the starting acid or derivative thereof. However, an excess of the acid or derivative thereof used as a starting material is not desirable unless the unreacted portion of the acid or derivative thereof can be readily removed from the reaction mixture at the completion of the desired reaction (e.g. when a volatile monocarboxylic organic acid is used as a starting material). I prefer to employ for each gram atom of nitrogen present in my starting organosilicon compound one chemical equivalent (based on the carbonyl groups present in the —COOH group of the acid, or in the —COG group of the acid halide, or in the COOR group of the ester, or in the —COOOC— group of the anhydride) of the starting acid or derivative thereof. Relative amounts of my starting materials other than those described can be employed; however, no commensurate advantage is gained thereby.

The reaction between my starting compounds can be carried out at temperatures which are not narrowly critical and which can vary over a wide range. I can employ temperatures of from as low as 0° C. to temperatures as high as 300° C.; however, I prefer to conduct the reaction at temperatures of from about 25° C. to about 150° C. Other temperatures may be used but no commensurate advantage is gained thereby. At temperatures below about 0° C. the rate of the reaction is extremely slow and at temperatures above 300° C. undesirable side reactions tend to occur.

The reaction between organosilicon compounds containing the aminoalkylsilyl grouping and the acid or derivatives thereof is preferably carried out within a liquid organic compound in which the starting materials are mutually soluble and which is non-reactive therewith.

When aminoalkylalkoxysilanes are used as starting materials in producing the compositions of this invention the liquid organic compound within which the reaction represented by Equation 1 may be conducted is preferably a compound that is miscible with water. The use of a liquid organic compound that dissolves the aminoalkylalkoxysilane and acid or acid anhydride starting materials and that is miscible with water was found to minimize the hydrolysis of the alkoxy groups of the aminoalkylalkoxysilane starting material by the water produced in the reaction of the aminoalkylalkoxysilane and the acid or acid anhydride as represented by Equation 1. Illustrative of such liquid organic compounds are cyclic ethers such as tetrahydrofuran and compounds that are represented by the formula $R'''O(CH_2CH_2O)_xR'''$ wherein $R'''$ is an alkyl group or a hydrogen atom that contains from 1 to 4 carbon atoms and $x$ is an integer that has a value of from 1 to 2.

When aminoalkylpolysiloxanes are used as starting materials in producing the compounds of this invention, the liquid organic compound within which the reaction represented by Equation 1 may be conducted is preferably one that is not miscible with water. Liquid organic compounds of the latter type are particularly useful in separating water from the reaction mixture. Illustrative of these liquid organic compounds are petroleum ether and aromatic hydrocarbons such as benzene, toluene and xylene.

When producing the compositions of this invention it is often advantageous to remove the non-silicon containing compound (i.e. the compound represented by the structural formula HM in Equation 1) produced along with the compositions of this invention continuously from the reaction mixture.

Pressures lower than atmospheric pressure may be used to aid in the removal of the non-silicon containing compounds produced along with the compositions of this invention continuously from the reaction mixture. This method is especially effective in removing the hydrogen halides produced when acid halides are used as reactants.

When monocarboxylic organic acids are used as starting materials in producing the compositions of this invention, water is the non-silicon containing compound produced along with the compositions of this invention. This water may be removed from the reaction mixture by adding a liquid organic compound which forms an azeotrope with water to the reaction mixture and then heating the reaction mixture to a temperature sufficiently elevated to volatilize the azeotrope. The volatilized azeotrope may be condensed, the condensate freed of water to produce the anhydrous liquid organic compound and the anhydrous liquid organic compound may be returned to the reaction mixture. Liquid organic compounds which form azeotropes with water that are useful in removing the water formed along with the compositions of this invention are benzene, toluene, xylene and the like.

The amount of the liquid organic compound, that forms an azeotrope with the water formed when producing the compositions of this invention, used in my process is not narrowly critical. Amounts of the liquid organic compounds of from 10 parts to 500 parts by weight per 100 parts by weight of the organosilicon compound that contains the aminoalkylsilyl grouping and the monocarboxylic organic acid used as starting materials are useful but amounts of the liquid organic compounds of from 20 parts to 100 parts by weight per 100 parts by weight of the organosilicon compound that contains the aminoalkylsilyl grouping and the monocarboxylic organic acid used as starting materials are preferred. Other amounts of the liquid organic compounds may be used but no commensurate advantage is gained thereby.

Hydrophilic absorbents and absorbents such as silica gel and activated alumina may be added to the reaction mixture to remove the water.

When monocarboxylic organic acid halides are used as starting materials in producing the compositions of this invention, tertiary amines, such as pyridine, quinoline and the like may be added to the reaction mixture. These tertiary amines continuously remove the hydrogen halides from the reaction mixtures as they are formed by combining with them to form inert salts. It is desirable to remove these hydrogen halides because they tend to catalyze or act as reactants in undesirable side reactions. Amounts of these tertiary amines of from 1 to 10 times the amount stoichiometrically required to combine with the hydrogen halide to form a salt are useful but amounts of these amines of from 1 to 1.5 times the amount stoichiometrically required to combine with the hydrogen halide are preferred. The amount of the tertiary amine used is not narrowly critical provided that at least the stoichiometric amount is used, and so other amounts may be used but no commensurate advantage is gained thereby.

When esters of monocarboxylic organic acids are used as starting materials in producing the compositions of this invention alcohols or phenols are produced along with the compositions of this invention. These alcohols and phenols may be removed from the reaction mixtures used in producing the compositions of this invention. Thus the alcohols may be removed by heating the reaction mixture to a temperature sufficiently elevated to volatilize the alcohol.

When an anhydride of a monocarboxylic organic acid is used as a starting material in producing the compositions of this invention, a monocarboxylic organic acid is produced along with the compositions of this invention. These monocarboxylic acids may be left in the reaction mixture since they will undergo reacting with the organosilicon compounds that contain the aminoalkylsilyl grouping to produce compositions of this invention.

The compounds of this invention are organosilicon compounds that contain an acylamino group which is linked to a silicon atom through a polymethylene chain containing at least three carbon atoms. As used herein the acylamino group is the group that is represented by the structural formula:

wherein R has the above-described meaning. The compounds of this invention contain the acylaminoalkylsilyl grouping. This acylaminoalkylsilyl grouping may be represented by the structural formula:

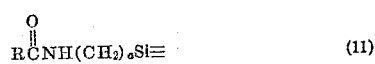     (11)

wherein R and ($a$) have the above-described meanings.

The compounds of this invention that are produced from the aminoalkylalkoxysilanes that are represented by structural Formula 2 and the monocarboxylic organic acids and derivatives thereof represented by Formulae 7a through 10 are acylaminoalkylalkoxysilanes that may be represented by the structural formula:

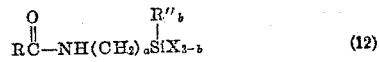     (12)

wherein R, ($a$), R'', X and ($b$) have the above-described meanings. Illustrative of these acylaminoalkoxysilanes are gamma-acetylaminopropyltriethoxysilane, delta-benzoylaminobutylmethyldiethoxysilane, delta - acryloylaminobutyldimethylethoxysilane and the like. In the production of these silanes of my invention some or all of the silicon-bonded alkoxy groups of the silanes used as starting materials may hydrozye to form hydroxyl groups or siloxane bonds. Such hydrolysis reactions are due to the presence of water in these reaction mixtures and the silanols of this invention so produced may be represented by structural Formula 12 wherein R, ($a$), R'' and ($b$) have the above-defined meanings, X is an alkoxy group or a hydroxyl group and at least one group represented by X is a hydroxyl group.

The compounds of this invention that are produced from the aminoalkylpolysiloxanes that contain the structural units represented by structural Formula 3 and the monocarboxylic organic acids and derivatives thereof represented by Formulae 7a through 10 are acylaminoalkylpolysiloxanes that contain the structural unit that may be represented by the structural formula:

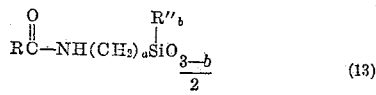
(13)

wherein R, (a), R'' and (b) have the above-described meanings. Illustrative of these units are the gamma-acetylaminopropylsiloxy unit, the delta-propanoylaminobutylmethylsiloxy unit, the delta-benzoylaminobutyldimethylsiloxy unit and the like.

The compounds of this invention that are produced from the aminoalkylpolysiloxanes that contain the structural unit represented by the structural Formula 4 and the monocarboxylic organic acids and derivatives thereof represented by Formulae 7a through 10 are acylaminoalkylpolysiloxanes that contain the structural unit that may be represented by the structural formula:

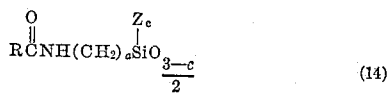
(14)

wherein R, (a), Z and (c) have the above-described meanings. Illustrative of these units are the gamma-acetylaminopropylhydroxysiloxy unit, the delta-propanoylaminobutylhydroxysiloxy unit, the delta-benzoylaminobutylethoxyphenylsiloxy unit and the like.

The compounds of this invention that are produced from the copolymeric aminoalkylpolysiloxanes that contain the structural units represented by structural Formulae 3 and 6 and the monocarboxylic organic acids and derivatives thereof represented by Formulae 7a through 10 are copolymeric acylaminoalkylpolysiloxanes that contain the structural units represented by structural Formulae 6 and 13.

My inventoin also provides for the formation of organosilicon compounds that contain the acylaminoalkylsilyl grouping by reacting the above-described organosilicon compounds that contain the aminoalkylsilyl grouping with such compounds as formic acid and esters of formic acid, as well as lactones such as phenolphthalein.

Siloxane copolymers and homopolymers containing combined acylaminoalkylsiloxane units, which units are obtained by reacting phenolphthalein and copolymers and homopolymers containing combined aminoalkylsiloxane units according to the process of this invention, are useful as acid-base indicators in reaction mixtures containing organopolysiloxanes and a basic catalyst. By way of illustration cyclic dimethylsiloxanes may be equilibrated to form organopolysiloxanes of higher molecular weight by heating a mixture of the cyclic siloxanes and a basic catalyst. At the completion of such equilibration reactions it is often desirable to remove or neutralize the basic catalyst to prevent subsequent depolymerization of the organopolysiloxane so produced. The basic catalyst may serve to catalyze such a depolymerization. Some acid-base indicators are not useful in determining the point at which all of the basic catalyst has been removed from or neutralized in the mixture of the organopolysiloxane and the basic catalyst because the indicators are not compatible with the organopolysiloxane. However, copolymers and homopolymers containing combined acylaminoalkylsiloxaneunits, which units have been produced by reacting a siloxane copolymer or homopolymer containing a combined aminoalkylsiloxane unit and phenolphthalein according to the process of this invention, are compatible with organopolysiloxanes. The acyl portion of the combined acylaminoalkylsiloxane units in such siloxane copolymers and homopolymers functions as an acid-base indicator in mixtures containing organopolysiloxanes and basic catalysts.

My compounds also find use as additives for known silicone products. By way of illustration the difunctional acylaminoalkylsiloxanes can be either added to or equilibrated with dimethylpolysiloxanes to form modified oils or gums. The trifunctional acylaminoalkylsiloxanes can be employed themselves as thermosetting resins or they can be added to methylphenylpolysiloxanes of the thermosetting type as modifiers. Such thermosetting resins find use as coating materials.

Compounds of this invention, such as copolymeric oils containing combined gamma-(p-aminobenzoylamino)propylmethylsiloxane units and combined dimethylsiloxane units, a copolymeric oil containing combined gamma-(ortho-hydroxybenzoylamino)propylmethylsiloxane units and combined dimethylsiloxane units and gamma-[para-(n-butylamino)benzoylamino]propyltriethoxysilane, were found to be useful in protecting human skin from sunburn. These compounds were found to absorb the harmful ultraviolet rays of the sun.

The compounds of this invention may be alternately designated as amides rather than as acylamino substituted alkyl silanes and acylamino substituted alkyl siloxanes as designated herein.

The acyl portion of the acyl aminoalkylsilyl grouping that is present in the products of this invention is designated in accordance with I.U.C. Rule 58 as given on page 5877, section 74 of Chemical Abstracts, No. 24, volume 39, December 20, 1945 (e.g. propanoyl is the radical derived from the propanoic (propionic) acid and benzoyl is the radical derived from benzoic acid). An exception to the foregoing method of naming acyl radicals used herein is the radical derived from acetic acid which is designated by its common name, i.e. the acetyl radical.

The following examples illustrate this invention:

Example I

To a 500 cc. flask equipped with stirrer and dropping funnel was added delta-aminobutylmethyldiethoxysilane (102.6 grams, 0.5 mole). Then ethyl dichloroacetate (86.4 grams, 0.55 mole) was added dropwise to the flask. The reaction was rapid and exothermic. The reactants were heated to 180° C., the heating was stopped and the reaction product cooled. A total of 32 grams of distillate was collected in a cold trap. The distillate had a refractive index ($n_D^{25}$) of 1.3695. The residue in the flask was a yellow liquid. About half of the residue (87.1 grams) was placed into a boiling flask and fractionated by distillation. One fraction (16 grams) was obtained at 152–157° C. at 1.4–2.2 mm. Hg. Two more fractions were obtained, but the pressure became erratic, due apparently to decomposition in the distillation flask. The second fraction was obtained at 157–200° C. at 5 mm. Hg and the third fraction at 200–210° C. at 5 mm. Hg. Analysis showed that the three fractions were essentially of the same composition (i.e. delta-dichloroacetylaminobutylmethyldiethoxysilane,

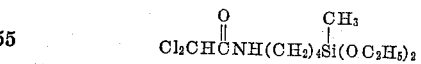

The three fractions were analyzed and the following results were obtained:

Calculated for delta-dichloroacetylaminobutylmethyldiethoxysilane (percent by wt.): Si, 8.9; N, 4.4; Cl, 22.4. Found (percent by wt.): First fraction: Si, 9.2; N, 4.4; Cl, 22.2; $n_D^{25}$, 1.4658. Second fraction: Si, 9.1; N, 4.5; Cl, 22.9; $n_D^{25}$, 1.4669. Third fraction: Si, 9.1; N, 4.4; Cl, 25.6; $n_D^{25}$, 1.4705.

All three fractions showed infra-red absorption characteristic of the

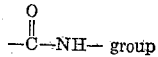 group

Example II

To a 500 cc. flask equipped with stirrer was added a copolymer containing 10 parts by weight of combined delta-aminobutylmethylsiloxane units and 90 parts by weight of combined dimethylsiloxane units per 100 parts by weight of the copolymer (100 grams, 0.076 gram-atom of N). The copolymer had an average molecular weight of 1000. Benzoic acid (9.3 grams, 0.076 mole) was then added to the flask. The contents of the flask were stirred at 25–30° C. until a homogeneous liquid was obtained. The viscosity of the liquid was 120 centipoises at 25° C. and its refractive index ($n_D^{25}$) was 1.4215. Xylene (100 cc.) was added to the liquid and water removed therefrom by distillation at 130–160° C. A total of 1.2–1.4 grams of water was removed. The amount of water that would have been removed had the reaction to form the acylamino group gone to completion was 1.37 grams. The xylene was then removed at reduced pressure to a maximum temperature of 125° C. The product was a liquid that had a viscosity of 52 centipoises at 25° C. and a refractive index ($n_D^{25}$) of 1.4250. The liquid (a copolymer containing combined delta-benzoylaminobutylmethylsiloxane units and dimethylsiloxane units) was analyzed and the following results were obtained:

Found: N, 1.1% by weight (original oil contained 1.1% by weight N).

The liquid had infra-red absorption characteristic of the

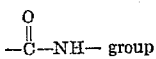

—C—NH— group

Example III

To a 500 cc. flask equipped with stirrer and water-ice cooling bath were added a copolymer containing 25 parts by weight of combined delta-aminobutylmethylsiloxane units and 75 parts by weight of combined dimethylsiloxane units per 100 parts by weight of the copolymer (100 grams, 0.19 gram-atom of N) and oleic acid (54.0 grams, 0.19 mole). A yellow liquid had a viscosity of 4,800 centipoises at 25° C. and a refractive index ($n_D^{25}$) of 1.4449, was produced. This liquid was a salt of the copolymer and acid. A sample of this salt was titrated with 0.1 NH$_4$Cl. Thirteen cc. were required to effect a color change with methyl red. Xylene (100 ml.) was added to the salt, the mixture so produced was heated to about 120–160° C., water was produced, and the water removed by azeotropic distillation. A total of 2.7 grams of water was removed in this manner. The amount of water that would have been produced had the reaction to form the acylamino grouping gone to completion was 3.4 grams. The product was a yellow oil. A sample of the same size as before was titrated with 0.1 NH$_4$Cl. This time only 1 cc. was needed to effect a color change with methyl red. This indicated that the salt had been converted to a more neutral compound. The refractive index ($n_D^{25}$) of the product was 1.4481, its viscosity was 8,300 centipoises at 25° C. and it had infra-red absorption characteristic of the

—CN—H group. The product was a copolymer that contained combined

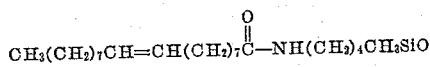

$CH_3(CH_2)_7CH=CH(CH_2)_7C$—NH$(CH_2)_4CH_2SiO$ units and combined $(CH_3)_2SiO$ units.

Example IV

In a 250-ml. round-bottomed flask were placed 85.0 grams (0.1 mole) of a copolymer that had the structural formula:

$(CH_3)_3SiO[H_2N(CH_2)_4Si(CH_3)O]$
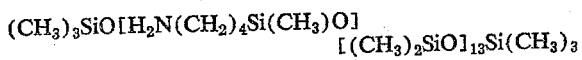
$[(CH_3)_2SiO]_{13}Si(CH_3)_3$ 80 ml. xylene, and 9.3 grams (0.05 mole) p-nitrobenzoyl chloride. The flask was equipped with a magnetic stirrer and Dean-Stark trap with reflux condenser. The mixture was refluxed for 2.0 hours at 130–160° C. with stirring. The mixture was then allowed to slowly come to room temperature and 100 ml. petroleum ether were added. No precipitation was observed. The volatiles were stripped off in two steps: first by heating the mixture at atmospheric pressure by means of a heating mantle until 110 ml. had been collected and secondly by heating the mixture in vacuo at pressure of 1.0 mm. Hg and maximum pot temperature of 150° C. There were obtained 74.4 grams of a copolymer containing combined delta-para-nitrobenzoylaminobutylmethylsiloxane units and combined dimethylsiloxane units i.e.

$(CH_3)_3SiO[O_2NC_6H_4CONH(CH_2)_4Si(CH_3)O]$
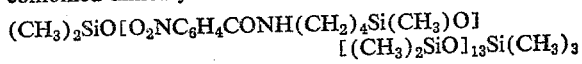
$[(CH_3)_2SiO]_{13}Si(CH_3)_3$ a light amber oil with the following physical properties: $n_D^{25}$ 1.4267; $d_4^{20}$ 0.934 grams/ml.; viscosity 518 centistokes at 25° C.; E max 8200 and λ max 2650 A. (Ref: F. Daniels et al., "Experimental Physical Chemistry, McGraw Hill, N.Y., 1949 4th ed., p. 22;

$$E \max = \frac{O.D.}{cd} = \text{the molar extinction coefficient}$$

where O.D. is the optical density of the solution, i.e. the logarithm of the ratio of the incident light to the transmitted light; C is the molar concentration of the solution, d is the thickness of the cell used in measuring the optical density of the solution).

The light amber oil was analyzed and the following results were obtained.

Calculated for $(CH_3)_3SiO[NO_2C_6H_4CONH(CH_2)_4Si(CH_3)O]$
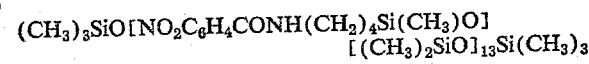
$[(CH_3)_2SiO]_{13}Si(CH_3)_3$ (percent by wt.): C, 37.9; H, 8.1; and N, 2.0. Found (percent by wt.): C, 37.2; H, 9.1; and N, 1.9.

Example V

In a one-liter Erlenmeyer flask were placed 22.1 grams (0.1 mole) gamma-aminopropyltriethoxysilane, 500 ml. benzene, and 7.9 grams (0.1 mole) pyridine. An addition funnel was charged with 14.1 grams (0.1 mole) benzoyl chloride. The benzoyl halide was added dropwise with swirling to the amino silicone solution over 15 minutes. The mixture was heated on a hot plate to 70° C. for 30 minutes and then allowed to stand at room temperature. During this time, a white crystalline solid (pyridine hydrochloride) formed. This solid increased in amount while the mixture was allowed to stand at room temperature for 5 days.

The entire mixture was poured into 500 ml. ice cold water that was in a two-liter Erlenmeyer flask. An aqueous phase and a benzene phase formed. The lower aqueous phase was separated and was extracted once with 100 ml. benzene. The two benzene phases were combined. The benzene phases were washed once with 100 ml. 5 wt.-percent aqueous potassium carbonate solution and once with 100 ml. distilled water. After being so washed the benzene phases were dried using anhydrous calcium sulfate for 2.0 hours.

The benzene phase was then concentrated to quarter volume and two 100 ml. portions of petroleum ether added, concentrating each time to quarter volume. The concentrated solution so produced was allowed to cool to room temperature. An oil separated from the solution in 10 minutes. Ten ml. of absolute ethanol were added and ten ml. of volatile products were evaporated from the solution. The solution was again allowed to cool to room temperature. More oil separated from the solution. The oil was separated from the solution and then the solution was evaporated to dryness in vacuo at room temperature. The product was gamma-benzoylaminopropylethoxydihydroxysilane. It was a fragrant colorless oil and was produced in a 62 mole-percent yield. The product had the following properties: $n_D^{25}$ 1.5128 and viscosity at 25° C. of 1900 centipoises.

The product was analyzed and the following results were obtained:

Calculated for $C_6H_5CONH(CH_2)_3SiOC_2H_5(OH)_2$ (percent by wt.)
C, 53.7; H, 7.1; N, 5.2; Si, 10.4; O, 23.8. Found (percent by wt.): C, 53.4; H, 8.3; N, 4.6; O (by diff.) 24.4; and Si, 9.3.

The product had strong infra-red absorption characteristic of the CONH group and the $SiOC_2H_5$ group as well as at a small amount of infra-red absorption which is characteristic of the SiOSi group. Absorption of CONH hinders SiOH observation.

Example VI

In a 50-ml. beaker were placed 30 grams of delta-aminobutylmethylsiloxane cyclic tetramer i.e.

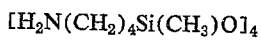

tetraalkyl ammonium hydroxide catalyst (150 p.p.m. of the catalyst). At this point the reaction mixture was not homogeneous, and consisted of a violet colored lower liquid layer and a colorless upper liquid layer. The tube was immersed in an oil bath at 150° C. and stirred for 5 minutes. During this heating period the mixture became homogeneous and violet colored throughout. Toward the end of the period, as the catalyst was thermally decomposed, the liquid became colorless. Thus the decomposition of the catalyst was indicated by the color change of the acylaminoalkylsilyl compound. The increased viscosity of the reaction product, compared to that of the starting materials, indicated that equilibration had occurred.

Example VII

The following ultra-violet absorption properties of some of the compounds of this invention were determined:

| Compound | Properties |
|---|---|
| Copolymer containing combined gamma-(para-amino-benzoylamino)propylmethylsiloxane units and combined dimethylsiloxane units.<br><br>$Me_3SiO\begin{bmatrix}Me\\SiO\\Me\end{bmatrix}_{\simeq 10}\begin{bmatrix}Me\\SiO\\(CH_2)_3\\NH\\C=O\\C_6H_4-NH_2\end{bmatrix}SiMe_3$ | Colorless oil. Soluble in alcohol and 50 cs. dimethylsilicone oil. Insoluble in water. Exhibits a max. at 2,850 A., E max.=12.2×10³ at conc.=0.08 g./l. in ethanol. |
| Copolymer containing combined gamma-(para-aminobenzoylamino)propylmethylsiloxane units and combined dimethylsiloxane units.<br><br>$Me_3SiO\begin{bmatrix}Me\\SiO\\Me\end{bmatrix}_{\simeq 60}\begin{bmatrix}Me\\SiO\\(CH_2)_3\\NH\\C=O\\C_6H_4-NH_2\end{bmatrix}_{\simeq 2.3}SiMe_3$ | Colorless oil. Soluble in alcohol and 50 cs. dimethylsilicone oil. Insoluble in water. Exhibits a max. at 2,830 A., E max.=1.43×10³ at conc.=0.116 g./l. in ethanol. |
| Copolymer containing combined gamma-(ortho-hydroxybenzoylamino)propylmethylsiloxane units and combined dimethylsiloxane units.<br><br>$Me_3SiO\begin{bmatrix}Me\\SiO\\Me\end{bmatrix}_{\simeq 10}\begin{bmatrix}Me\\SiO\\(CH_2)_3\\NH\\C=O\\C_6H_4-OH\end{bmatrix}SiMe_3$ | Colorless oil. Soluble in alcohol. Insoluble in water. Exhibits a max. at 3,000 A., E max.=4.5×10³ at conc.=0.025 g./l. in ethanol. |
| gamma-[para-(n-butylamino)-benzoylamino]propyltriethoxysilane.<br><br>$n-C_4H_9NH-C_6H_4-CONH-(CH_2)_3Si(OEt)_3$ | Low melting solid. Exhibits a max. at 3,080 A., E max.=28.8×10³ at conc.=0.016 g./l. in ethanol. |

Three-tenths of a gram of phenolphthalein were added to the beaker. A solution was attained at room temperature and the typical color of phenolphthalein in aqueous basic solutions was observed. The solution so formed was heated on hot plate at 50° C. for 20 minutes. Upon heating, however, the color was dissipated and an almost water clear solution was obtained indicating the formation of the acylamino group.

The acylaminobutylmethyl cyclic tetramer so produced was found to be useful as a compatible acid-base indicator in the preparation of various organosilicon polymers. For example, in one experiment, to a test tube were added 10 ml. of dimethylsiloxane cyclic tetramer, $[CH_3)_2SiO]_4$, 4 ml. of delta-aminobutylmethylsiloxane cyclic tetramer, $[H_2N(CH_2)_4SiCH_3O]_4$, 3 ml. of the above-mentioned acylaminoalkylsilyl compound and a

Example VIII

To a 250 cc. flask was added a mixture of cyclic gamma-aminopropylmethylsiloxanes that contained at least 3 combined gamma-aminopropylmethylsiloxane units per molecule (29.3 grams, 0.25 gram atom of N). Glacial acetic acid (15.0 grams, 0.25 mole) was added dropwise. After the addition of the first few drops a gum was formed so the reaction mixture was heated to 110° C. and most of the acetic acid added at the elevated temperature. Finally 75 cc. of water were added and the mixture heated gently until the gum dissolved. Several drops more acetic acid were then added so that the solution was slightly acidic. Volatiles were then removed from the solution by heating the solution to a temperature of 90° C. The residue so produced was a colorless solid that was soluble in water and ethanol but insoluble in benzene and that gave the following analysis:
Calculated for

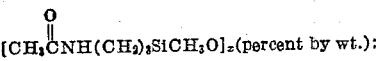[CH₃CNH(CH₂)₃SiCH₃O]₂(percent by wt.):

Si, 17.6; N, 8.8. Found (percent by wt.): Si, 17.8; N, 8.1.

The infra-red absorption spectrum showed bands characteristic of the

—CNH— group. No bands characteristic of primary amine could be detected. The product was a mixture of cyclic gamma-acetylaminopropylmethylsiloxanes.

Example IX

To a 500 cc. flask was added a copolymer (200 grams, 0.188 gram-atom of N) that contained 10 parts by weight of combined gamma-aminopropylmethylsiloxane units and 90 parts by weight of combined dimethylsiloxane units per 100 parts by weight of the copolymer. This copolymer was an oil with a molecular weight of 5,000. While swirling the contents of the flask, acrylic acid (13.6 grams, 0.188 mole) was added dropwise at 0–25° C. At this point a colorless liquid was formed that was neutral to litmus paper. The liquid was heated to a temperature of 190° C. at reduced pressure over a period of an hour. During this heating 4.3 grams of a liquid distillate were obtained. (The theoretical amount of water which would be formed by complete conversion to the acylaminoalkylsiloxane unit is 3.5 grams.) The undistilled reaction product was a viscous, colorless liquid. The infra-red absorption spectrum of the viscous, colorless liquid showed bands characteristic of the

—CNH— group. The viscous, colorless liquid was a copolymer that contained combined gamma-acryloylaminopropylmethylsiloxane units

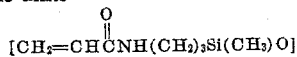[CH₂=CHCNH(CH₂)₃Si(CH₃)O]

and combined dimethylsiloxane units. It contained 1.0% by weight of N and 33.4% by weight Si.

The reaction of a lactone with a compound containing the aminoalkylsilyl grouping according to the process of this invention to produce a compound containing acylaminoalkylsilyl grouping may be illustrated by the reaction of phenolphthalein and delta-aminobutylmethylsiloxane cyclic tetramer, which reaction may be illustrated by the following equation:

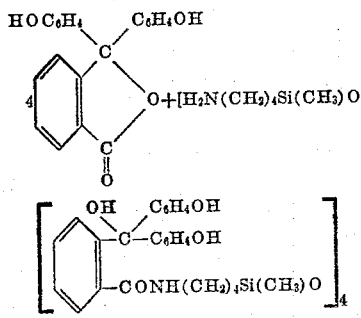

What is claimed is:

1. A process for producing an organosilicon compound that contains an acylaminoalkylsilyl grouping which is represented by the structural formula:

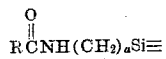RCNH(CH₂)ₐSi≡ wherein R is a member selected from the group consisting of alkyl groups, aryl groups, alkenyl groups and monovalent heterocyclic rings, said heterocyclic rings being composed of carbon and at least one member selected from the group consisting of nitrogen, oxygen and sulfur, the silicon atom is attached to at least one member selected from the group consisting of the alkoxy and the siloxy groups, each remaining unfilled valence of the silicon atom being satisfied by a member selected from the group consisting of the alkyl, aryl, aralkyl, hydroxyl, alkoxy and siloxy groups and (a) is an integer that has a value of at least 3, which process comprises forming a mixture of an organosilicon compound that contains an aminoalkylsilyl grouping which is represented by the structural formula:

$$H_2N(CH_2)_aSi\equiv$$

wherein (a) has the above-defined value and silicon is connected to groups as above-defined and an organic carbonyl compound that is represented by the structural formula:

RC—M wherein R has the above-defined meaning and M is a member selected from the group consisting of —OR groups, the

—OC—R groups, the hydroxyl group and the halogen atoms, maintaining the mixture at a temperature from 0° C. to 300° C. for a time sufficiently prolonged to cause the compound containing the aminoalkylsilyl grouping and the organic carbonyl compound to react to produce the compound containing the acylaminoalkylsilyl grouping and removing from said mixture the non-silicon by-product formed during the reaction.

2. A process for producing an organosilicon compound that contains an acylaminoalkylsilyl grouping which is represented by the structural formula:

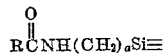RCNH(CH₂)ₐSi≡ wherein R is a member selected from the group consisting of alkyl groups, aryl groups, alkenyl groups and monovalent heterocyclic rings, said heterocyclic rings being composed of carbon and at least one member selected from the group consisting of nitrogen, oxygen and sulfur, the silicon atom is attached to at least one member selected from the group consisting of the alkoxy and the siloxy groups, each remaining unfilled valence of the silicon atom being satisfied by a member selected from the group consisting of the alkyl, aryl, aralkyl, hydroxyl, alkoxy and siloxy groups and (a) is an integer that has a value of at least 3, which process comprises forming a mixture of an organosilicon compound that contains an aminoalkylsilyl grouping which is represented by the structural formula:

$$H_2N(CH_2)_aSi\equiv$$

wherein (a) has the above-defined value and silicon is connected to groups as above-defined and a monocarboxylic organic acid that is represented by the structural formula:

RCOOH wherein R has the above-defined meaning, maintaining the mixture at a temperature from 25° C. to 150° C. for a time sufficiently prolonged to cause the monocarboxylic organic acid and the compound containing the aminoalkylsilyl grouping to react to produce the compound containing the acylaminoalkylsilyl grouping and continuously removing from said mixture the non-silicon by-products formed during the reaction.

3. A process for producing an acylaminoalkylpolysiloxane that contains a structural unit that is represented by the structural formula:

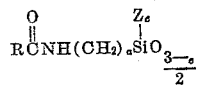

wherein R is a member selected from the group consisting of the alkyl groups, aryl groups, the alkenyl groups and monovalent heterocyclic rings, said heterocyclic rings being composed of carbon and at least one member selected from the group consisting of nitrogen, oxygen and sulfur (a) is an integer that has a value of at least 3, Z is a member selected from the group consisting of the hydroxyl group and the alkoxy groups and (c) is an integer that has a value from 0.1 to 1.0, which process comprises forming a mixture of an aminoalkylpolysiloxane that contains a structural unit that is represented by the structural formula:

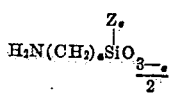

wherein (a), Z and (c) have the above-defined meanings and an organic carbonyl compound that is represented by the structural formula:

wherein R has the above-defined meaning and M is a member selected from the group consisting of —OR groups, the

groups, the hydroxyl group and the halogen atoms, maintaining the mixture at a temperature from 25° C. to 150° C. for a time sufficiently prolonged to cause the aminoalkylpolysiloxane and the organic carbonyl compound to react to produce the acylaminoalkylpolysiloxane and continuously removing from said mixture the non-silicon by-products formed during the reaction.

4. A process for producing an acylaminoalkylpolysiloxane that contains the structural unit that are represented by the structural formula:

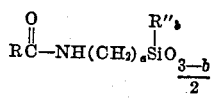

wherein R is a member selected from the group consisting of alkyl groups, aryl groups, alkenyl groups and monovalent heterocyclic rings, said heterocyclic rings being composed of carbon and at least one member selected from the group consisting of nitrogen, oxygen and sulfur (a) is an integer that has a value of at least 3, R″ is a member selected from the group consisting of the alkyl groups, aryl groups and arylalkyl groups, and (b) is an integer that has a value of from 0 to 2, which process comprises forming a mixture of an aminoalkylpolysiloxane that contains the structural unit that is represented by the structural formula:

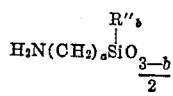

wherein (a), R″ and (b) have the above-defined meanings and an organic carbonyl compound that is represented by the structural formula:

wherein R has the above-defined meaning and M is a member selected from the group consisting of —OR groups, the

groups, the hydroxyl group and the halogen atoms, maintaining the mixture at a temperature from 25° C. to 150° C. for a time sufficiently prolonged to cause the aminoalkylpolysiloxane and the organic carbonyl compound to react to produce the acylaminoalkylpolysiloxane and continuously removing from said mixture the non-silicon by-products formed during the reaction.

5. A process for producing acylaminoalkylpolysiloxanes that contain combined structural units that are represented by the structural formulae:

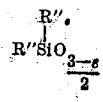

and

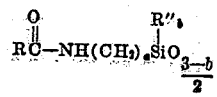

wherein R″ is a member selected from the group consisting of the alkyl groups, the aryl groups and the arylalkyl groups, (e) is an integer that has a value from 0 to 2, R is a member selected from the group consisting of alkyl groups, the aryl groups, the alkenyl groups and monovalent heterocyclic rings, said heterocyclic rings being composed of carbon and at least one member selected from the group consisting of nitrogen, oxygen and sulfur (a) is an integer that has a value of at least 3 and (b) is an integer that has a value from 0 to 2, which process comprises forming a mixture of an aminoalkylpolysiloxane that contains combined structural units that are represented by the structural formulae:

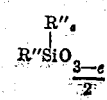

and

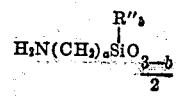

wherein R″, (e), (a) and (b) have the above-defined meanings and an organic carbonyl compound that is represented by the structural formula:

wherein R has the above-defined meaning and M is a member selected from the group consisting of —OR groups, the

groups, the hydroxyl group and the halogen atoms, maintaining the mixture at a temperature from 25° C. to 150° C. for a time sufficiently prolonged to cause the aminoalkylpolysiloxane and the organic carbonyl compound to react to produce the acylaminoalkylalkoxysilane and continuously removing from said mixture the non-silicon by-products formed during the reaction.

6. An organosilicon compound that contains the acylaminoalkylsilyl grouping which is represented by the structural formula:

wherein R is a member selected from the group consisting of alkyl groups, aryl groups, alkenyl groups and monovalent heterocyclic rings, said heterocyclic rings being composed of carbon and at least one member selected from the group consisting of nitrogen, oxygen and sulfur, the silicon atom is attached to at least one member selected from the group consisting of the alkoxy and the siloxy groups, each remaining unfilled valence of the silicon atom being satisfied by a member selected from the group consisting of the alkyl, hydroxyl, aryl, aralkyl, alkoxy and siloxy groups and (a) is an integer that has a value of at least 3.

7. An acylaminoalkylalkoxysilane that is represented by the structural formula:

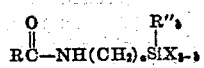

wherein R is a member selected from the group consisting of alkyl groups, aryl groups, alkenyl groups and monovalent heterocyclic rings, said heterocyclic rings being composed of carbon and at least one member selected from the group consisting of nitrogen, oxygen and sulfur, $(a)$ is an integer that has a value of at least 3, R'' is a member selected from the group consisting of the alkyl groups, aryl groups and arylalkyl groups, X is an alkoxy group and $(b)$ is an integer that has a value of from 0 to 1.

8. An acylaminoalkylpolysiloxane that contains the combined structural unit that is represented by the structural formula:

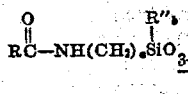

wherein R is a member selected from the group consisting of alkyl groups, aryl groups, alkenyl groups and monovalent heterocyclic rings, said heterocyclic rings being composed of carbon and at least one member selected from the group consisting of nitrogen, oxygen and sulfur, $(a)$ is an integer that has a value of at least 3, R'' is a member selected from the group consisting of the alkyl groups, aryl groups and arylalkyl groups, and $(b)$ is an integer that has a value of from 0 to 2.

9. An acylaminoalkylpolysiloxane that contains the combined structural unit that is represented by the structural formula:

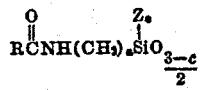

wherein R is a member selected from the group consisting of alkyl groups, aryl groups, alkenyl groups and monovalent heterocyclic rings, said heterocyclic rings being composed of carbon and at least one member selected from the group consisting of nitrogen, oxygen and sulfur, $(a)$ is an integer that has a value of at least 3, Z is a member selected from the group consisting of the hydroxyl group and the alkoxy groups and $(c)$ is an integer that has an average value from 0.1 to 1.0.

10. Delta - dichloroacetylaminobutylmethyldiethoxysilane.

11. An organosilicon compound that contains combined delta-benzoylaminobutylmethylsiloxane units.

12. A copolymer that contains combined trimethylsiloxane units, combined para-nitrobenzoylaminobutylmethylsiloxane units and combined dimethylsiloxane units.

13. A copolymer that contains combined gamma-acryloylaminopropylmethylsiloxane units and combined dimethylsiloxane units.

14. A copolymer that contains combined gamma-(para-aminobenzoylamino)propylmethylsiloxane units and dimethylsiloxane units.

References Cited in the file of this patent

UNITED STATES PATENTS

| | | |
|---|---|---|
| 2,557,803 | Sommer | June 19, 1951 |
| 2,715,133 | Speier | Aug. 9, 1955 |
| 2,738,357 | Speier | Mar. 13, 1956 |
| 2,754,311 | Elliott et al. | July 10, 1956 |
| 2,754,312 | Elliott et al. | July 10, 1956 |
| 2,762,823 | Speier | Sept. 11, 1956 |
| 2,832,754 | Jex et al. | Apr. 29, 1958 |

OTHER REFERENCES

Noll et al.: "Jour. Am. Chem. Soc.," volume 73 (1951), pages 3867–70.